United States Patent Office 3,394,130
Patented July 23, 1968

3,394,130
QUATERNARY METHINE COMPOUNDS
James M. Straley and John G. Fisher, Kingsport, Tenn., assignors to Eastman Kodak Company, Rochester, N.Y., a corporation of New Jersey
No Drawing. Filed Oct. 4, 1965, Ser. No. 492,866
9 Claims. (Cl. 260—240.9)

ABSTRACT OF THE DISCLOSURE

Quaternary methine compound prepared by condensing a trialkyl-2-methyleneindoline with a carbocyclic aromatic aldehyde having a dicarboximidoalkylamino group attached thereto are useful as dyes for acrylic polymer textile material.

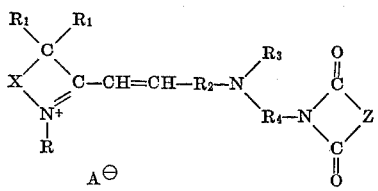

This invention relates to quaternary methine compounds particularly characterized by containing a dicarboximido radical, and textile fibers, yarns and fabrics dyed with the methine compounds.

The quaternary methine compounds have the general formula

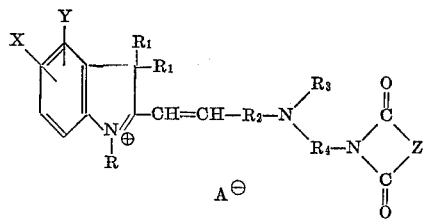

wherein:

X and Y represents either hydrogen; halogen, e.g. Cl or Br; nitro; lower alkoxy; lower alkyl; or lower carboalkoxy, e.g. —COOCH$_3$, COOC$_2$H$_5$, etc.; or X and Y taken together represent —CH=CH—CH=CH— which completes a fused on monocyclic, carbocyclic, aromatic nucleus, atoms, including C or at least one atom other than carbon, e.g. C and O;

R and R$_1$ are the same or different lower alkyl groups e.g. as present in the 1,3,3-trimethylindolyl or 1,3-dimethyl-3-ethylindolyl radicals, R$_2$ represents a monocyclic carbocyclic aromatic group, including p-phenylene and substituted p-phenylene groups such as given below.

R$_3$ represents hydrogen; lower alkyl; lower alkyl substituted with chlorine, hydroxy, cyano, phenylcarbamoyloxy, methoxy, or acetoxy; or

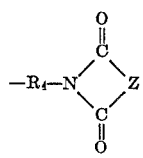

R$_4$ is a lower alkylene group straight or branch-chained, e.g. ethylene, isopropylene etc., Z represents a chain of atoms, including C or at least one atom other than carbon, e.g. C and O; C and N; C and S atoms, necessary to complete a ring of 5 or 6 members such as the chains —CH=CH—, —CH$_2$—CH$_2$—, —CH$_2$—CH$_2$—CH$_2$, o-phenylene,

—CH$_2$—O—CH$_2$—, —CH$_2$—NH—CH$_2$—,

—NH—CH$_2$—CH$_2$—, —CH$_2$—SO$_2$CH$_2$—,

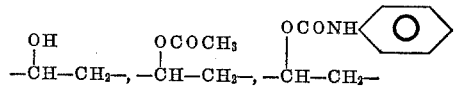

etc. as present in e.g. succinimido, phthalimido rings and other rings given below, A$^\ominus$ is an acid anion such as Cl$^-$, Br$^-$, CH$_3$SO$_4^-$, CH$_3$‹O›SO$_3^-$, HSO$_4^-$, CH$_3$COO$^-$ H$_2$PO$_4^-$, ZnCl$_3^-$, ZnBr$_3^-$, etc.

The alkyl chains in the above groups are preferably lower alkyl of 1 to 4 carbon atoms.

The substituents attached to the aromatic group R$_2$, to the alkyl group R$_3$ and to group Z serve primarily as auxochrome groups to control the color of the methine compound and can be varied widely to obtain compounds especially useful as textile dyes. For example, R$_2$ includes phenylene unsubstituted or substituted phenylene such as alkylphenylene, e.g., o,m-methylphenylene; alkoxyphenylene, e.g. o,m-methoxyphenylene, halophenylene, e.g. o,m-chlorophenylene; alkylsulfonamidophenylene, e.g. o,m,-methylsulfonamidophenylene; dicarboxylicacidimidophenylene, e.g. o,m-succinimidophenylene; acylamidophenylene, e.g. o,m-acetamidophenylene; benzamidophenylene; thiocyanophenylene, e.g. o,m-thiocyinophenylene; alkylthiophenylene, e.g. o,m-methylthiophenylene; benzylaminophenylene, e.g. o,m-benzylaminophenylene; N-alkylbenzaminophenyl, e.g. o,m-N-phenylmethylaminophenylene; carbalkoxyphenylene e.g. o,m-carbethoxyphenylene; benzoylphenylene, e.g. o,m-benzoylphenylene;

Typical dicarboximido radicals represented by

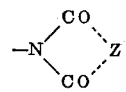

where Z represents a carbon chain are
succinimido
phthalimido
tetrachloro phthalimido
tetrahydro phthalimido
hexahydro phthalimido
4-carboxy phthalimido
3-nitro phthalimido
3-methyl phthalimido
3-amino phthalimido
glutarimido
bicyclo[2.2.1]-5-heptene-2,3-dicarboximido

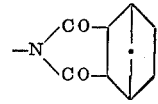

1,8-naphthalimido
citraconimido cycloalkanedicarboximido e.g.

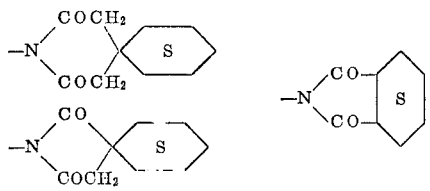

alkyl succinimido e.g.

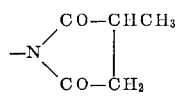

alkenyl succinimido e.g

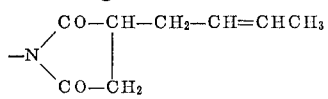

campherimido

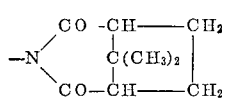

9,10-dihydroanthracene, 9,10-endo succinimido

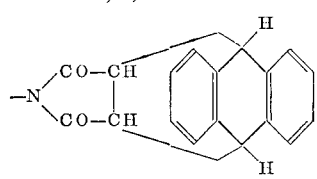

The methine compounds of Formula I above are prepared by condensing in acid solution a 1,3,3-trialkyl-2-methylene indoline with an aldehyde of the formula

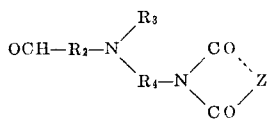

as illustrated in the following reaction

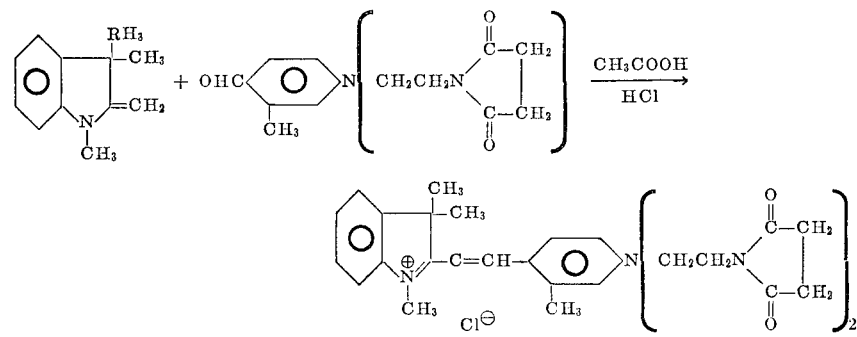

The aldehydes of the above formula where Z is a carbon chain, are prepared by reacting $POCl_3$ and dimethyl formamide with 5- and 6-membered cyclic dicarboximidoalkyl aniline compounds such as disclosed in Straley et al., U.S. Patent 3,161,631 granted Dec. 15, 1964. For illustration, 89 g. (0.5 m.) of N-β-aminoethyl-N-ethyl m-toluidine and 74 g. (0.5 m.) of phthalic anhydride are mixed intimately and heated gradually until an exothermic reaction begins. The temperature rises to 120° C. without further heating. After the temperature begins to fall, heat is applied and held at 130–140° C. for 1 hour. The partially cooled melt is drowned in 500 cc. of hot ethanol and allowed to cool. The product is filtered off, washed with a little alcohol, and dried at 60° C. The yield is 129 g. of material melting at 86–87° C. According to analysis this product N-[2(N-ethyl-m-toluidine)ethyl]-phthalimide has the structure:

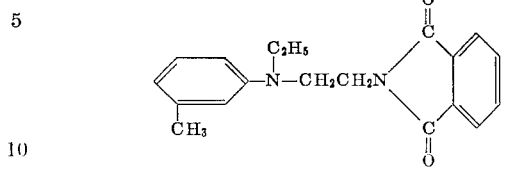

30.8 g. (0.1 m.) N-[2(N-ethyl-m-toluidine)ethyl]-phthalimide above is dissolved in 30 ml. of dimethylformamide by heating to about 50° C. The solution is cooled, and 11 ml. of phosphorus oxychloride is added, keeping the temperature below 25° C. The reaction is then heated on the steam bath for 1 hour. It is drowned in 500 ml. water. The product comes down sticky but solidifies on standing. It is filtered off, washed with water, and recrystallized from 100 ml. of ethyl alcohol. Yield: 30.7 g., M.P. 127–128.5° C. The preparation of the aldehydes is further described in U.S. Ser. No. 252,283, filed Jan. 18, 1963 and U.S. Ser. No. 465,208 filed June 18, 1965.

Similarly the aldehydes in which Z represents a chain of atoms containing at least one atom other than carbon i.e. O, N or S, as present in the radicals: 3,5-morpholinedione, 2,5-piperazinedione, 5,6-dihydrouracil and 2,4-thiazolidinedione of the azo compounds described below, are prepared by formylation of the corresponding aniline derivative. Preparations of the latter are illustrated as follows:

Preparation 3-[2-(N-ethyl-m-toluidino)ethyl]hydantoin 19.7 g. N-2-chloroethyl-N-ethyl-m-toluidine, 10.0 g. hydantoin, 13.8 g. potassium carbonate, and 150 ml. dry dimethylformamide were refluxed together for one hour. The reaction mixture was drowned into 500 ml. of water giving a white solid on standing. The product was recrystallized from ethanol to give 13.5 g. of material melting at 76–77° C., having the structure:

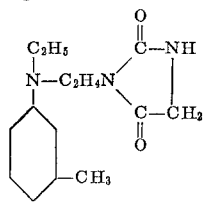

Preparation of 3-[2-(N-ethyl-m-toluidino)ethyl]-5,5-dimethylhydantoin 19.7 g. N-2-chloroethyl-N-ethyl-m-toluidine, 12.8 g. 5,5-dimethylhydantoin, 13.8 g. potassium carbonate, and 150 ml. dry dimethylformamide were refluxed together for one hour. Drowning into water, filtering, and recrystallizing from 75 ml. ethanol gave 15.2 g. white solid product with M.P. 81–82° C.

Preparation of 3-[2-(N-ethyl-m-toluidino)ethyl]-1-methyl hydantoin 19.7 g. N-2-chloroethyl-N-ethyl-m-toluidine, 11.4 g. 1-methylhydantoin, 13.8 g. potassium carbonate, and 100 ml. dry dimethylformamide were refluxed together for one hour. Drowning in water resulted in a white solid which was collected by filtration, washed with water, and recrystallized from 100 ml. ethanol to yield 18.5 g. product with M.P. 72–73° C.

Preparation of 4-[2-(N-ethyl-m-toluidino)ethyl]-3,5-morpholinedione 89.0 g. N-2-aminoethyl-N-ethyl-m-toluidine, 67.0 g. diglycolic acid, and 0.1 g. sulfanilic acid were heated together at 150–155° C. for one hour. The reaction mixture was poured into 500 ml. ethanol and the product allowed to crystallize. After collection by filtration and recrystallization from 500 ml. ethanol there was obtained 70.5 g. of product of M.P. 82–83° C. This material has the following structure:

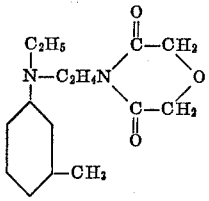

Preparation of 1-[2-(N-ethyl-m-toluidino)ethyl]-2,5-piperazinedione 44.5 g. N-2-aminoethyl-N-ethyl-m-toluidine, 33.2 g. iminodiacetic acid, 0.1 g. sulfanilic acid were heated together at 180–190° C. for one hour. The reaction mixture was then poured into 300 ml. ethanol and the product allowed to crystallize. Collection by filtration gave 20.0 g. product when air dried. M.P. 191–194° C. One recrystallization from ethanol gave material melting at 197.5–198.5° C. The product had the following structure:

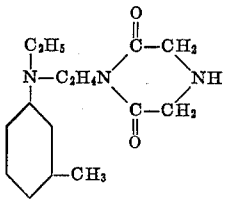

Preparation of 3-[2-(N-ethyl-m-toluidino)ethyl]5,6-dihydrouracil 19.7 gm. N-2-chloroethyl-N-ethyl-m-toluidine, 11.4 g. 5,6-dihydrouracil, 13.8 g. potassium carbonate, and 100 ml. dry dimethylformamide were refluxed together for one hour. The reaction mixture was drowned into water, and the product collected by filtration, washed with water, and recrystallized from 50% aqueous ethanol. Yield: 20.5 g., M.P. 108–110° C. The product has the following structure:

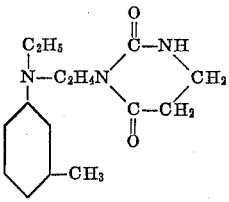

Preparation of 3-[2-(N-ethyl-m-toluidino)ethyl]2,4-thiazolidinedione 19.7 g. N-2-cloroethyl-N-ethyl-m-toluidine, 11.7 g. 2,4-thiazolidinedione, 13.8 g. potassium carbonate, and 100 ml. dry dimethylformamide were heated together at 130° C. for one hour. Drowning of the reaction mixture into water gave a yellow oil, which was washed by decantation and taken up in 100 ml. ethanol. The product crystallized when alcohol solution was chilled. There was obtained 10.0 g. of product after filtering and drying in air. M.P. 59–60° C.

The 1,3,3-trimethyl-2-methylene indolines are compounds well-known in the art.

The quaternary compounds are especially useful as dyes for acrylic polymer textile materials such as those containing acrylonitrile units yielding dyeings having a variety of colors and having good fastness, for example, to washing, light, gas (atmospheric fumes), and sublimation. The azo compounds can also be expected to respond favorably to other tests as textile dyes described in A.A.T.C.C. Technical Manual, 1964 edition. The degree of utility can be expected to vary depending in part upon the textile material being dyed and the formula of the particular quaternary compound in use. Thus, generally all of the quarternary compounds will not have the same degree of utility for the same textile material.

The quaternary indole methine compounds of the invention exhibit substantially better dyeing and fastness properties such as light-fastness, than do similar quaternary methine compounds such as

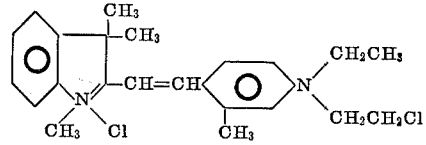

The following example illustrates one way in which the methine compounds of the invention can be used to dye acrylonitrile polymer textile material. .1 gram of dye is dissolved by warming in 5 cc. of methyl Cellosolve. A 2% aqueous solution of a nonionic surfactant, such as Igepal CA (a polymerized ethylene oxide-alkylphenol condensation product) is added slowly until a fine emulsion is obtained and then the dye mixture is brought to a volume of 200 cc. with warm water. 5 cc. of a 5% aqueous solution of formic acid or acetic acid are added and then 10 grams of fabric made from an acrylic fiber is entered and in the case of Orlon 42 the dyeing is carried out at the boil for one hour. In the case of materials made of Verel acrylic fiber the dyebath temperature should not exceed 90° C. in order to avoid damage to the fiber. The dyed material is then washed well with water and dried.

Representative acrylonitrile polymer textile fibers, yarns and fabrics dyed by the azo compounds include those polymers containing at least about 35% combined acrylonitrile units and up to about 95% acrylonitrile units, and modified, for example, by 85–5% of vinyl pyridine units as described in U.S. Patents 2,990,393 (Re. 25,533) and 3,014,008 (Re. 25,539) or modified by 65–5% of vinylpyrrolidone units, for example, as described by U.S. Patent 2,970,783, or modified with 65–5% acrylic ester or acrylamide units as described in U.S. Patents 2,879,-253; 2,879,254 and 2,838,470. Similar amounts of the other polymeric modifiers mentioned above are also useful.

A preferred group of copolymers are the modacrylic polymers such as described in U.S. Patent 2,831,826 composed of a mixture of (A) 70–95% by weight of a copolymer of from 30 to 65% by weight of vinylidene chloride or vinyl chloride and 70–35% by weight of acrylonitrile, and (B) 30–5% by weight of a second polymer from the group consisting of (1) homopolymers of acrylamidic monomers of the formula

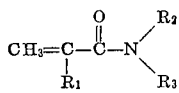

wherein $R_1$ is selected from the group consisting of hydrogen and methyl, and $R_2$ and $R_3$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of a polymerizable monovinyl pyridine monomer.

A particularly efficacious group of modacrylic polymers is an acetone soluble mixture of (A) 70–95% by weight of a copolymer of 30–65% by weight of vinylidene chloride and 70–35% by weight of acrylonitrile and (B) 30–5% by weight of an acrylamide homopolymer having the above formula wherein $R_1$, $R_2$ and $R_3$ are as described above. Specific polymers of that group contain 70–95% by weight of (A) a copolymer of from 30–65% by weight of vinylidene chloride and 70–35% by weight of acrylonitrile and (B) 30–5% by weight of a lower N-alkylacrylamide polymer such as poly-N-methylacrylamide, poly-N-isopropylacrylamide and poly-N-tertiarybutylacrylamide.

The following examples will serve to illustrate our invention.

EXAMPLE 1

A solution of 3.13 g. of 4(N,β-succinimidoethyl-N,β-cyanoethylamino) o-tolualdehyde and 1.73 g. of 1,3,3-trimethyl-2-methylene indoline in 20 ml. of acetic acid was heated at 95–100° C. for four hours. The resulting red solution was poured into 1 l. of water. Two grams of zinc chloride and 50 ml. of conc. HCl was added followed by 20 g. of NaCl. The precipitated dye was collected on a funnel, washed with an aqueous salt solution and allowed to dry at room temperature. This dye imparts red shades to acrylic fibers and has the following structure.

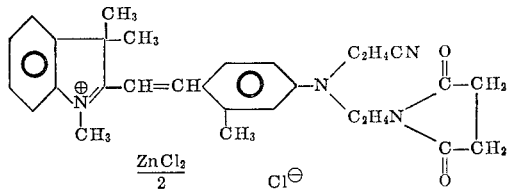

EXAMPLE 2

Thet aldehyde in Example 1 is replaced by 2.99 g. of 4(N,β-cyanoethyl-N,β-succinimidoethylamino)benzaldehyde to obtain 5.0 g. of a dye which imparts fast scarlet shades to acrylic fibers. This dye has the following structure.

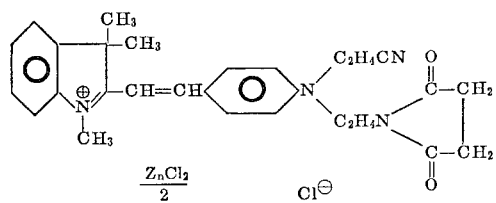

EXAMPLE 3

A solution of 3.7 g. of 4(N,N-diβ-succinimidoethylamino)benzaldehyde and 1.73 g. of 1,3,3-trimethyl-2-methylene indoline in 20 ml. of acetic acid was heated on the steam bath for four hours. The red solution was drowned in 1 l. of water and the dye precipitated by addition of solid NaI with good stirring. The dye was collected on a funnel, washed with 25 ml. of water and dried at 40° C. This dye imparts fast yellowish-red shades to acrylic fibers and has the following structure.

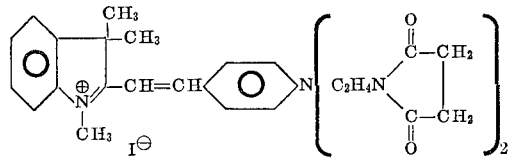

EXAMPLE 4

The indoline in Example 1 is replaced by 2.08 g. of 1,3,3-trimethyl-2-methylene-5-chloroindoline, to obtain 5.3 g. of the following dye. This dye imparts fast bluish-red shades to acrylic fibers.

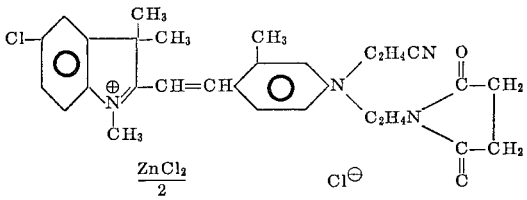

EXAMPLE 5

The aldehyde in Example 1 is replaced by 4.6 g. of 4(N,N - di - β-phthalimidoethylamino)-o-tolualdehyde to obtain 6.02 g. of the following dye.

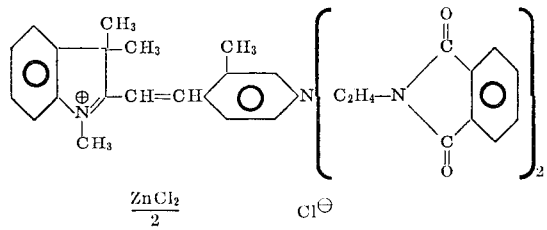

EXAMPLE 5a

Into a 300 ml. 3-necked flask equipped with a stirrer, thermometer, and condenser was placed a mixture of 10.38 grams (0.06 mole), 1,3,3-trimethyl-2-methylene indoline, 18.79 grams (0.06 mole), 4-([N-(β-cyanoethyl)-N-(β-succinimidoethyl)]amino-2-methybenzaldehyde, and 126 grams [120 ml.] of acetic acid. The mixture was heated slowly to 90–95° C. and held there for 4 hours. The reaction mixture was then drowned into 1000 grams of 10–15° C. water followed by the addition of 12.0 grams [0.074 mole] of zinc sulfate, 150 grams of 93% sulfuric acid, and 200 grams of anhydrous sodium sulfate, the latter being added over a 20 minute period to avoid lumping. The mixture was stirred for one hour, filtered, and the dye dried at 60° C. The dye, giving fast red shades on acrylic fibers, has the following formula:

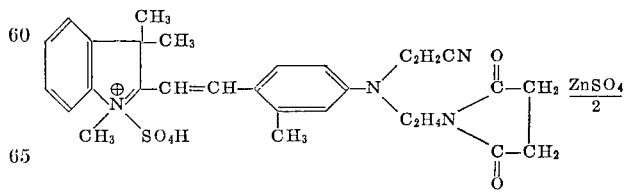

Methine compounds containing the other anions A⊖ described above are obtained by use in Example 1 process of the appropriate acid such as phosphoric or p-toluenesulfonic acids in place of hydrochloric acid.

Additional methine compounds having Formula I above are prepared in the manner described in Example 1 by reacting the appropriate indoline and aldehyde indicated in the following table.

| Example | X | Y | R | $R_1$ | Substituent on p-phenylene radical $R_2$ | $R_3$ | Z | Color on Acrylic Fibers |
|---|---|---|---|---|---|---|---|---|
| 6 | Cl | H | $CH_3$ | $CH_3$ | m-$CH_3$ | $-C_2H_4Cl$ | $-CH_2-CH_2-$ | Bluish red. |
| 7 | $-\overset{O}{\underset{\|}{C}}-OCH_3$ | H | $CH_3$ | $CH_3$ | m-$CH_3$ | $-C_2H_4CN$ | $-CH_2-CH_2-$ | Do. |
| 8 | $-NO_2$ | H | $CH_3$ | $CH_3$ | m-$CH_3$ | $-C_2H_4CN$ | $-CH_2-CH_2-$ | Do. |
| 9 | $-CH_3$ | H | $CH_3$ | $CH_3$ | m-$CH_3$ | $-C_2H_4CN$ | $-CH_2-CH_2-$ | Red violet. |
| 10 | $-CH=CH-CH=CH-$ | | $CH_3$ | $CH_3$ | m-$CH_3$ | $-C_2H_4CN$ | $-CH_2-CH_2-$ | Red. |
| 11 | H | H | $C_7H_{15}$ | $CH_3$ | m-$CH_3$ | $-C_2H_4CN$ | $-CH_2-CH_2-$ | Bluish red. |
| 12 | H | H | $CH_3$ | $CH_3$ | m-$CH_3$ | $-C_2H_5$ | $-CH_2-CH_2-$ | Red. |
| 13 | H | H | $CH_3$ | $CH_3$ | m-$CH_3$ | $C_4H_9$ | 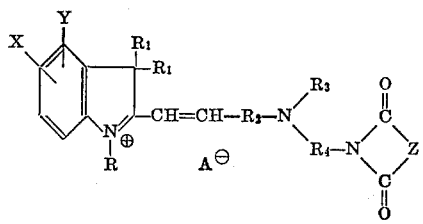 | Bluish red. |
| 14 | H | H | $CH_3$ | $CH_3$ | m-$CH_3$ | $-C_2H_5$ | $-CH\overset{CH_2}{\underset{CH_2}{\diagdown\diagup}}CH_2$ $-CH\diagdown\diagup CH_2$ | Do. |
| 15 | H | H | $CH_3$ | $CH_3$ | m-$CH_3$ | $-C_2H_4O\overset{O}{\underset{\|}{C}}-NH-C_6H_5$ | $-CH_2CH_2-$ | Red. |
| 16 | H | H | $CH_3$ | $CH_3$ | m-$CH_3$ | $-CH_2-\overset{Cl}{\underset{\|}{CH}}-CH_2Cl$ | $-CH_2CH_2-$ | Red. |
| 17 | H | H | $CH_3$ | $CH_3$ | m-$CH_3$ | $-C_2H_4CN$ | $-CH_2OCH_2-$ | Red. |
| 18 | H | H | $CH_3$ | $CH_3$ | m-$CH_3$ | $-C_2H_4Cl$ | $-CH_2NHCH_2-$ | Red. |
| 19 | H | H | $CH_3$ | $CH_3$ | H | $-C_2H_5$ | $-CH_2CH_2CH_2-$ | Orange red. |
| 20 | H | H | $CH_3$ | $CH_3$ | m-$CH_3$ | $-C_2H_5$ | $-NH-CH_2CH_2-$ | Red. |
| 21 | H | H | $CH_3$ | $CH_3$ | H | $CH_3$ | $-CH_2-SO_2-CH_2$ | Orange red. |
| 22 | Cl | $CH_3$ | $CH_3$ | $CH_3$ | m-$CH_3$ | $-C_2H_4Cl$ | 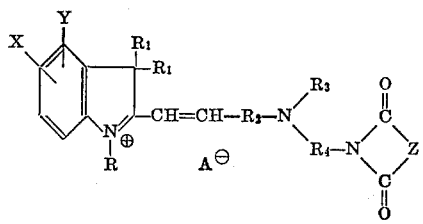 | Bluish red. |
| 23 | Cl | $CH_3$ | $CH_3$ | $CH_3$ | m-$CH_3$ | $-C_2H_4CN$ | 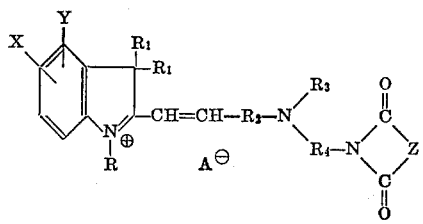 | Do. |
| 24 | Cl | $CH_3$ | $CH_3$ | $CH_3$ | m-$CH_3$ | $-C_2H_4CN$ | 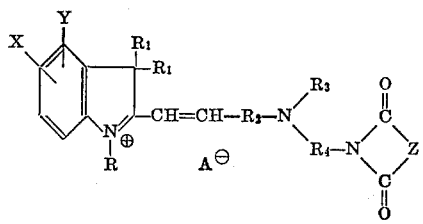 | Red. |
| 25 | $-CH=CH-CH=CH-$ | | $CH_3$ | $CH_3$ | $CH_3$ | $-C_2H_4Cl$ | $-C_2H_4-$ | Red violet. |
| 26 | $-CH=CH-CH=CH-$ | | $CH_3$ | $CH_3$ | $CH_3$ | $-C_2H_4Cl$ | 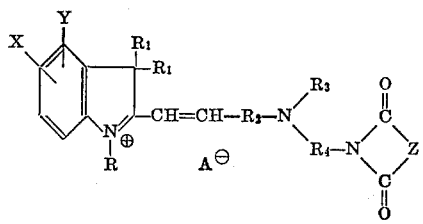 | Do. |
| 27 | H | H | $CH_3$ | $CH_3$ | $CH_3$ | $-CH_2CH_2OH$ | $-CH_2CH_2-$ | Red. |
| 28 | H | H | $CH_3$ | $CH_3$ | $CH_3$ | $-CH_2CH_2OCOCH_3$ | $-CH_2CH_2-$ | Red. |
| 29 | H | H | $CH_3$ | $CH_3$ | $CH_3$ | $-CH_2CH_2OCH_3$ | $-CH_2CH_2-$ | Red. |
| 30 | H | H | $CH_3$ | $CH_3$ | $CH_3$ | H | $-CH_2CH_2-$ | Red. |
| 31 | H | H | $CH_3$ | $CH_3$ | o-$CH_3$ | $-C_2H_4CN$ | $-CH_2CH_2-$ | Red. |
| 32 | H | H | $CH_3$ | $C_2H_5$ | m-$CH_3$ | $-C_2H_4CN$ | $-CH_2CH_2-$ | Red. |
| 33 | H | H | $CH_3$ | $CH_3$ | m-O$CH_3$ | $-C_2H_4CN$ | $-CH_2CH_2-$ | Red. |
| 34 | H | H | $CH_3$ | $CH_3$ | o-Cl | $-C_2H_4CN$ | $-CH_2CH_2-$ | Red. |

Although the invention has been described in considerable detail with particular reference to certain preferred embodiments thereof, it will be understood that variations and modifications can be effected within the spirit and scope of the invention as described hereinabove, and as defined in the appended claims.

We claim:
1. A quaternary methine compound having the formula wherein:

X and Y each represents hydrogen, chlorine, bromine, nitro, lower alkoxy, lower alkyl, or lower carboalkoxy, or X and Y taken together represent

—CH=CH—CH=CH—

R and $R_1$ are the same or different and each represents lower alkyl;

$R_2$ represents p-phenylene, methyl-p-phenylene, methoxy-p-phenylene, chloro-p-phenylene, bromo-p-phenylene, acetamido-p-phenylene, benzamido-p-phenylene, methylthio-p-phenylene, or methylsulfonamido-p-phenylene;

$R_3$ represents hydrogen, lower alkyl, lower chloroalkyl, lower hydroxyalkyl, lower cyanoalkyl, lower phenylcarbamoyloxyalkyl, lower methoxyalkyl, lower acetoxyalkyl, or $$-R_4-N\begin{matrix}\diagup C=O\\ \diagdown C=O\end{matrix}Z$$

$R_4$ represents lower alkylene;
Z represents ethylene, propylene, isopropylene, vinylene, methylvinylene, o-phenylene, tetrachloro-o-phenylene, nitro-o-phenylene, methyl-o-phenylene, amino-o-phenylene, tetrahydro-o-phenylene, 1,2-cyclohexylene, bicyclo[2.2.1]-5-heptene-2,3-ylene,

—CH$_2$OCH$_2$—

—CH$_2$NHCH$_2$—, —NHCH$_2$CH$_2$—,

—CH$_2$SO$_2$CH$_2$—, —NHCH$_2$—, —NHC(CH$_3$)$_2$—,

—N(CH$_3$)CH$_2$—

$$-\overset{OH}{\underset{|}{C}}HCH_2-,\ -\overset{OCOCH_3}{\underset{|}{C}}HCH_2-,\ \text{or}\ -\overset{OCONH\text{-phenyl}}{\underset{|}{C}}HCH_2-$$

A represents an acid anion.

2. A quaternary methine compound having the formula

![structure]

wherein:

X and Y represents either hydrogen, chlorine, bromine, methyl, nitro, or carbomethoxy, or X and Y taken together represent —CH=CH—CH=CH—;
R and R$_1$ are the same or different and each represents methyl or ethyl;
R$_2$ represents p-phenylene, methyl-p-phenylene, methoxy-p-phenylene, chloro-p-phenylene, or bromo-p-phenylene;
R$_3$ represents lower alkyl, chloroethyl, cyanoethyl, phenylcarbamoyloxyethyl, dichloropropyl, hydroxyethyl, acetoxyethyl, methoxyethyl, or $$-R_4-N\begin{matrix}\diagup C=O\\ \diagdown C=O\end{matrix}Z$$

$R_4$ represents ethylene or isopropylene;
Z represents ethylene, propylene, isopropylene, vinylene, methylvinylene, o-phenylene, tetrachloro-o-phenylene, nitro-o-phenylene, methyl-o-phenylene, amino-o-phenylene, tetrahydro-o-phenylene, 1,2-cyclohexylene, bicyclo[2.2.1]-5-heptene-2,3-ylene, CH$_2$OCH$_2$—, —CH$_2$NHCH$_2$—, —NHCH$_2$CH$_2$—, CH$_2$SO$_2$CH2—, —NHCH$_2$—, —NHC(CH$_2$)$_2$—, —N(CH$_3$)CH$_2$—, $$-\overset{OH}{\underset{|}{C}}HCH_2-,\ -\overset{OCOCH_3}{\underset{|}{C}}HCH_2-,\ \text{or}\ -\overset{OCONH\text{-phenyl}}{\underset{|}{C}}HCH_2-\text{ and}$$

A represents an acid anion.

3. A quaternary methine compound having the formula

![structure]

wherein:

X represents hydrogen or chlorine;
R$_2$ represents p-phenylene or methyl-p-phenylene;
Z represents ethylene, propylene, vinylene, or o-phenylene; and
A represents an acid anion.

4. A compound according to claim 3 wherein:
Z represents ethylene or o-phenylene; and
A represents a chloride, iodide or sulfate ion.

5. A quaternary compound of the formula

![structure]

wherein A$^\ominus$ is an acid anion.

6. A quaternary compound of the formula

![structure]

wherein A$^\ominus$ is an acid anion.

7. A quaternary compound of the formula

![structure]

wherein A$^\ominus$ is an acid anion.

8. A quaternary compound of the formula

![structure]

wherein A$^\ominus$ is an acid anion.

9. A quaternary compound of the formula
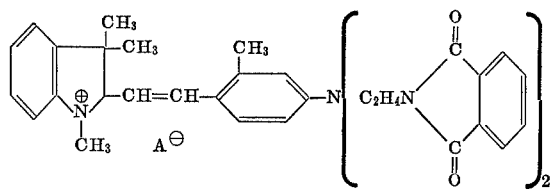
wherein A⊖ is an acid anion.
References Cited
UNITED STATES PATENTS
2,850,520  10/1958  Merian et al.
HENRY R. JILES, *Primary Examiner.*
H. I. MOATZ, *Assistant Examiner.*